United States Patent
Woodard et al.

(10) Patent No.: US 11,776,093 B2
(45) Date of Patent: Oct. 3, 2023

(54) AUTOMATIC SHARPNESS ADJUSTMENT FOR IMAGING MODALITIES

(71) Applicant: University of Florida Research Foundation, Incorporated, Gainesville, FL (US)

(72) Inventors: Damon Woodard, Newberry, FL (US); Navid Asadizanjani, Gainesville, FL (US); Domenic J. Forte, Gainesville, FL (US); Ronald Wilson, Gainesville, FL (US)

(73) Assignee: University of Florida Research Foundation, Incorporated, Gainesville, FL (US)

( * ) Notice: Subject to any disclaimer, the term of this patent is extended or adjusted under 35 U.S.C. 154(b) by 355 days.

(21) Appl. No.: 16/923,255

(22) Filed: Jul. 8, 2020

(65) Prior Publication Data

US 2021/0019865 A1 Jan. 21, 2021

Related U.S. Application Data

(60) Provisional application No. 62/874,822, filed on Jul. 16, 2019.

(51) Int. Cl.
*G06T 5/00* (2006.01)
*H04N 19/93* (2014.01)

(52) U.S. Cl.
CPC ............. *G06T 5/003* (2013.01); *H04N 19/93* (2014.11)

(58) Field of Classification Search
CPC .......... G06T 5/003; G06T 2207/10061; G06T 2207/30168; G06T 7/0002;
(Continued)

(56) References Cited

U.S. PATENT DOCUMENTS 4,831,409 A * 5/1989 Tatara ................... H04N 1/46
347/900
5,075,872 A * 12/1991 Kumagai ............... G06T 7/11
345/589
(Continued)

FOREIGN PATENT DOCUMENTS

CN 106023258 A * 10/2016
JP 06162195 A * 6/1994
(Continued)

*Primary Examiner* — Ian L Lemieux
*Assistant Examiner* — Woo C Rhim
(74) *Attorney, Agent, or Firm* — ALSTON & BIRD LLP

(57) ABSTRACT

Systems and methods are configured to generate a frequency map representing a density of objects found in regions of a sample that may be used in setting parameters for imaging the regions. Various embodiments involve binarizing the pixels for a raw image of the sample to transform the image into binary data. Run-length encoded components are identified from the data for dimensions of the raw image. Each component is a length of a sequence of adjacent pixels found in a dimension with the same value in the binary data. A projection of the image is then generated from projection values for the dimensions. Each projection value provides a measure of the density of objects present in a dimension with respect to the components identified for the dimension. This projection is used to identify a level of density for each region of the sample from which the frequency map is generated.

21 Claims, 12 Drawing Sheets

(58) Field of Classification Search
CPC . G06T 2207/10024; G06T 2207/20084; G06T 2207/20081; G06T 2207/10016; G06T 7/70; G06T 7/0012; G06T 7/90; G06T 2207/20021; G06T 2207/30148; G06T 5/008; G06T 5/00; G06T 7/001; G06T 7/11; G06T 2207/10081; G06T 9/00; G06T 9/001; G06T 7/10; G06T 7/00; H04N 19/93; H04N 5/23229; H04N 5/23222; H04N 1/41; H04N 1/64; H04N 19/169; H04N 19/17; H04N 19/10; H04N 19/102; H04N 19/124; H04N 19/119; G06N 3/08; G06N 20/00; G06N 3/02; G06V 10/82; G06V 10/764; G06V 40/193; G06V 2201/06; G06V 10/758; G06V 10/245; G06V 2201/03; G06V 10/10; G06K 9/6267; G06K 9/6227; G06K 9/00; G01B 11/25; G01B 11/2513

See application file for complete search history.

(56) References Cited

U.S. PATENT DOCUMENTS

| | | | | |
|---|---|---|---|---|
| 5,570,298 A * | 10/1996 | Suzuki | | G06V 10/507 |
| | | | | 382/199 |
| 5,588,071 A * | 12/1996 | Schultz | | G06T 5/007 |
| | | | | 382/168 |
| 5,706,096 A * | 1/1998 | Koike | | H04N 1/41 |
| | | | | 382/239 |
| 6,320,981 B1 * | 11/2001 | Yada | | G06T 9/005 |
| | | | | 382/168 |
| 6,346,157 B1 * | 2/2002 | Takezawa | | C21D 7/06 |
| | | | | 148/580 |
| 6,631,210 B1 * | 10/2003 | Mutoh | | H04N 1/40062 |
| | | | | 358/1.9 |
| 7,298,896 B2 * | 11/2007 | Yamaguchi | | H04N 1/40062 |
| | | | | 382/172 |
| 7,372,594 B1 * | 5/2008 | Kusakabe | | H04N 1/32229 |
| | | | | 358/1.9 |
| 8,416,260 B1 * | 4/2013 | Carpenter | | G06T 15/005 |
| | | | | 345/619 |
| 2001/0036314 A1 * | 11/2001 | Yamaguchi | | G06V 10/28 |
| | | | | 382/172 |
| 2003/0169915 A1 * | 9/2003 | Takeo | | G06T 7/0012 |
| | | | | 382/132 |
| 2004/0008869 A1 * | 1/2004 | Tsujimoto | | G06T 7/41 |
| | | | | 356/600 |
| 2004/0105108 A1 * | 6/2004 | Adachi | | G06T 7/00 |
| | | | | 358/1.9 |
| 2007/0133036 A1 * | 6/2007 | Matsunoshita | | H04N 1/00912 |
| | | | | 358/1.14 |
| 2007/0206228 A1 * | 9/2007 | Miyagi | | H04N 1/40062 |
| | | | | 358/448 |
| 2008/0220347 A1 * | 9/2008 | Tomita | | G03G 15/011 |
| | | | | 430/48 |
| 2009/0245640 A1 * | 10/2009 | Li | | G06V 10/28 |
| | | | | 382/175 |
| 2009/0252396 A1 * | 10/2009 | Morita | | G06T 7/11 |
| | | | | 382/132 |
| 2010/0322514 A1 * | 12/2010 | Koehler | | G06T 11/005 |
| | | | | 382/173 |
| 2013/0058588 A1 * | 3/2013 | Wang | | G06T 5/003 |
| | | | | 382/255 |
| 2013/0301067 A1 * | 11/2013 | Nakamura | | H04N 1/00082 |
| | | | | 358/1.13 |
| 2014/0193029 A1 * | 7/2014 | Vassilieva | | G06V 10/273 |
| | | | | 382/103 |
| 2015/0015918 A1 * | 1/2015 | Eguchi | | G06T 5/001 |
| | | | | 358/3.27 |
| 2015/0054982 A1 * | 2/2015 | Ota | | G06T 3/40 |
| | | | | 348/231.6 |
| 2015/0161474 A1 * | 6/2015 | Jaber | | G06V 10/462 |
| | | | | 382/203 |
| 2016/0012614 A1 * | 1/2016 | Goto | | G06T 11/003 |
| | | | | 382/131 |
| 2016/0267658 A1 * | 9/2016 | Kleppe | | G02B 21/008 |
| 2016/0301945 A1 * | 10/2016 | Saito | | H04N 19/40 |
| 2018/0114088 A1 * | 4/2018 | Tanaka | | G06V 30/158 |
| 2019/0228543 A1 * | 7/2019 | Morimoto | | H04N 1/603 |
| 2019/0251445 A1 * | 8/2019 | Movshovitz-Attias | | |
| | | | | G06N 3/0445 |
| 2020/0410655 A1 * | 12/2020 | Imamura | | G06F 3/1208 |

FOREIGN PATENT DOCUMENTS

| | | | | |
|---|---|---|---|---|
| JP | 2002318994 A | * | 10/2002 | |
| JP | 2005192485 A | * | 7/2005 | ........... C12M 41/36 |
| JP | 2006086749 A | * | 3/2006 | |
| JP | 2011112810 A | * | 6/2011 | |
| JP | 5331661 B2 | * | 10/2013 | |
| WO | WO-2012173571 A1 | * | 12/2012 | ............ G06T 5/009 |
| WO | WO-2016203922 A1 | * | 12/2016 | ............ G06T 5/009 |

* cited by examiner

AUTOMATIC SHARPNESS ADJUSTMENT FOR IMAGING MODALITIES

CROSS-REFERENCE TO RELATED APPLICATIONS

This application claims the benefit of U.S. Provisional Patent Application Ser. No. 62/874,822, filed Jul. 16, 2019, which is incorporated herein by reference in its entirety, including any figures, tables, and drawings.

TECHNICAL FIELD

The present application relates to automatically adjusting sharpness over an image obtained through an imaging modality.

BACKGROUND

Imaging modalities are used every day for obtaining images of various objects in various fields and industries. Some examples of imaging modalities include Scanning Electron Microscopy (SEM), Transmission Electron Microscopy (TEM), Computed Tomography (CT scan), and Magnetic Resonance Imaging (MRI). A critical component with respect to using any one of these technologies is the sharpness (quality) of the image provided. "Sharpness" generally relates to the clarity of detail provided for an object found in the image. Many applications of imaging modalities require a high level of detail to be provided on various objects found within in an image. For example, an image of a patient's knee obtained via an MRI may need to provide a high level of detail with respect to the anterior cruciate ligament of the knee so that an accurate assessment of an injury to the ligament can be made using the image.

However, imaging modalities typically acquire images by giving equal focus to all of the objects found within the imaging focus irrespective of their shapes and sizes. In situations where accuracy is extremely important, this can require higher magnification settings leading to an overall inflation of the imaging time frame.

For example, SEM is commonly used in the semiconductor industry, particularly for integrated circuits (IC) failure analysis. With the growing concerns of physical attacks on electronics with malicious intent, SEM has recently become more attractive for hardware assurance and especially, for reverse engineering (RE). However, RE of an IC requires long hours of imaging even if it is done with the help of automation software. Typically the estimated imaging time for a high resolution SEM can go up to thirty days for an IC of size 1.5 mm×1.5 mm that is manufactured at the 130 nm node technology. Due to the ongoing trend of adding more structures onto the limited space of an IC, the imaging time frame has become unfeasible. These drawbacks might be manageable in situations where there is a prior knowledge on the exact locations to be imaged. However, in the case of hardware assurance and reverse engineering, where all the structures in the entire target IC need to be extracted precisely without any prior knowledge, the drawbacks can be a major limiting factor.

The problem of faster imaging has been addressed before using, for example, compressed sensing algorithms as discussed in Principe, E. L., Navid Asadizanjani, Domenic Forte, Mark Tehranipoor, Robert Chivas, Michael DiBattista, Scott Silverman, Mike Marsh, Nicolas Piche, and John Mastovich. "Steps Toward Automated Deprocessing of Integrated Circuits." ISTFA, 2017. However, the approach described in this article does not incorporate the density of the objects being imaged and thus fails to consider whether all the regions in an image warrant the same sharpness settings for resolving the relevant features satisfactorily.

Other examples include Larson, K. W. et al. U.S. Pat. No. 8,907,280, and Binev, P. et al., Springer, Modeling Nanoscale Imaging in Electron Microscopy (pp. 73-126), 2012. In these examples, the imaging modalities employ compressive sensing by using the concept of first projecting multiple scan beams in specific predetermined or random patterns to model the image in a sparse representation space and then reconstructing the image from that representation. The increased speed is obtained from the ability of the algorithm to generate the image from reduced sampling. However, the technique can be memory demanding and slow.

Therefore, a need exists in the art to develop processes for faster imaging while providing needed sharpness within an image obtained from an imaging modality. It is with respect to these considers and other that the disclosure herein is presented.

BRIEF SUMMARY

In general, embodiments of the present invention provide methods, apparatus, systems, computing devices, computing entities, and/or the like for generating a frequency map representing a density of objects found in a plurality of regions of a sample. Various embodiments involve binarizing a plurality of pixels for a raw image of the sample to transform the raw image into binary data. The binary data includes a value of one or zero set for each pixel of the plurality of pixels to quantize the raw image into two discrete intensity levels. A plurality of run-length encoded components is then identified from the binary data for each of a plurality of dimensions for the raw image. For example, the plurality of dimensions may be rows or columns of the raw image. Here, each run-length encoded component for a particular dimension is a length of a sequence of adjacent pixels found in the particular dimension with the same value in the binary data.

At least one projection of the raw image is then generated in various embodiments based at least in part on a projection value for each of the plurality of dimensions. The projection value for a particular dimension provides a measure of the density of the objects present in the particular dimension based at least in part on the run-length encoded components identified for the particular dimension. Accordingly, the projection is then used to identify a level of density for each of the plurality of regions for the sample and to generate a frequency map that includes the level of density identified for each region. This frequency map may then be used in particular embodiments to set at least one parameter differently than used to acquire the raw image for acquiring images of regions of the sample identified with a particular level of density. For example, the parameter may be a magnification that is set higher than a magnification used to acquire the raw image.

For instance, in particular embodiments, the level of density may be identified for each region as low density in response to one or more projection values corresponding to the region being above a threshold and as high density in response to the one or more projection values corresponding to the region being below the threshold. Here, for example, the threshold may be based a mean of the projection values that make up the projection. While in another instance, the level of density may be identified as low density in response to one or more projection values corresponding to the region being closer to a higher mean of a first distribution of the projection values and a high density in response to the one or more projection values corresponding to the region being closer to a lower mean of a second distribution of the projection values. For example, one or more Gaussian Mixture Models may be used to fit the projection values that make up the projection to the first and second distributions.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

Figure 9:
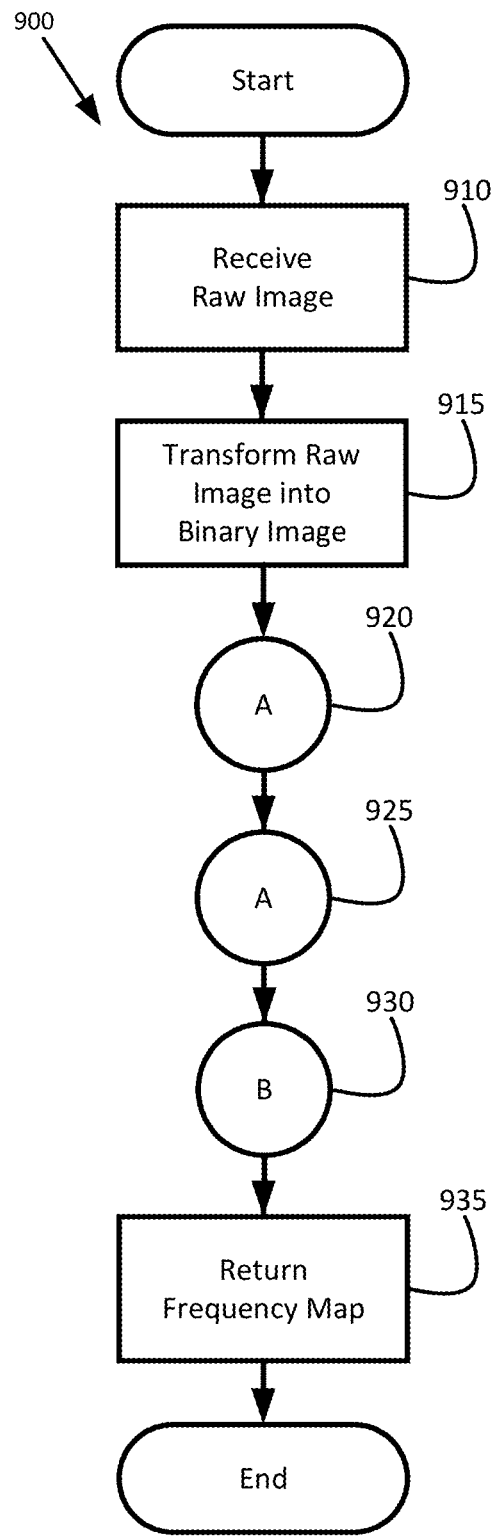
Figure 10:
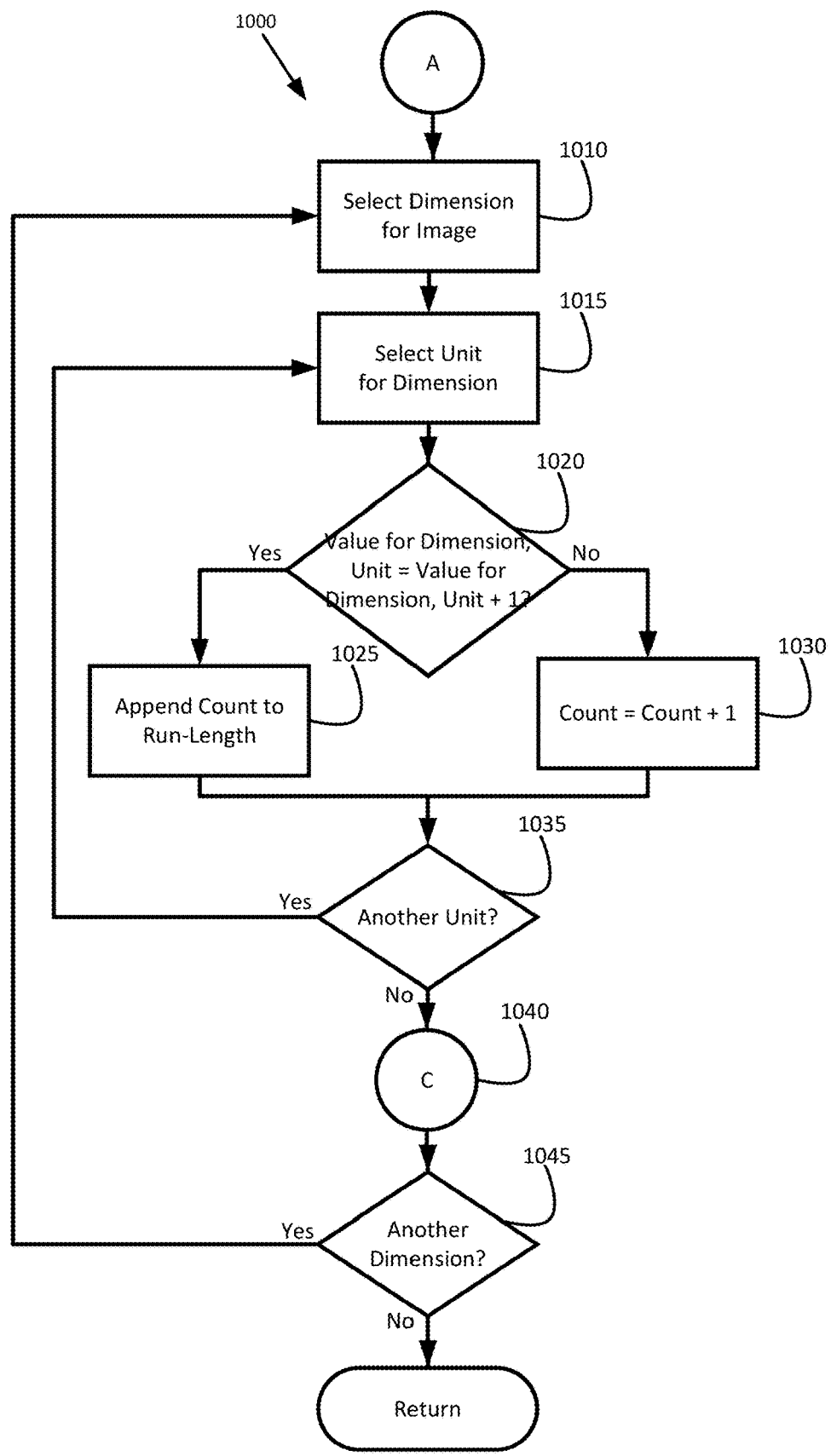
Figure 11:
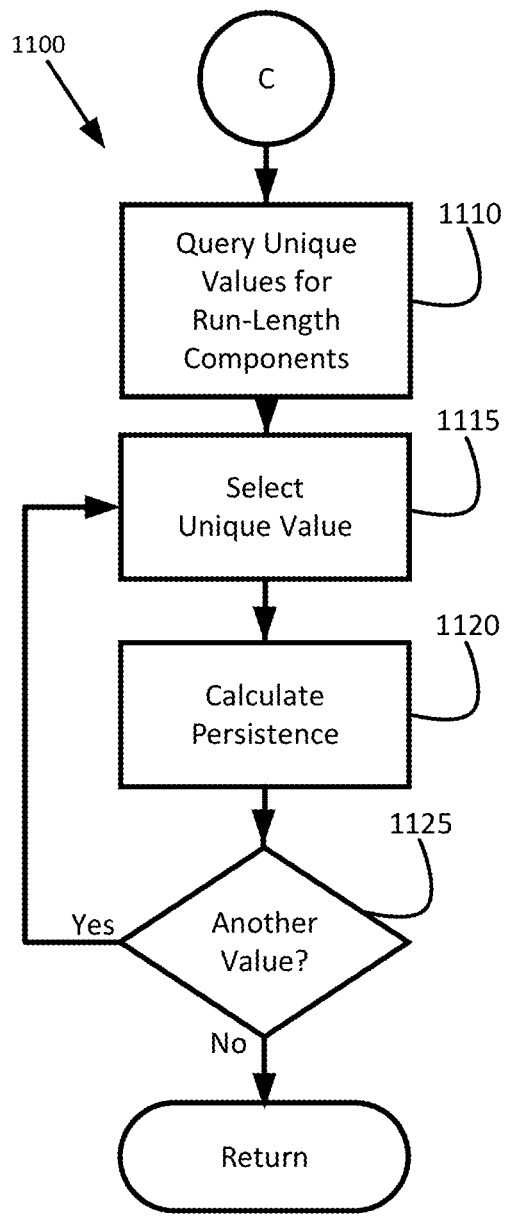
Figure 12:
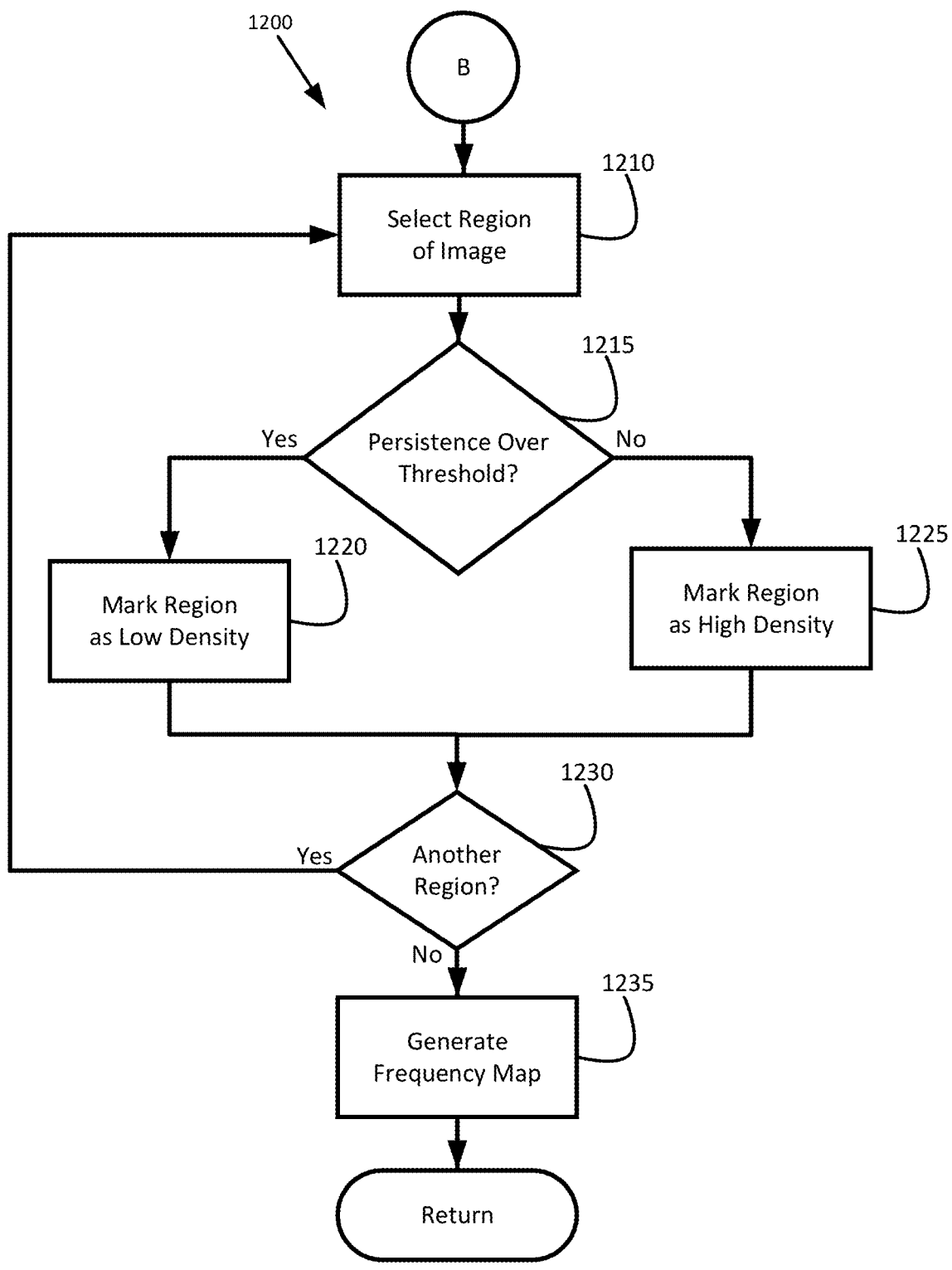

FIG. 9 provides a process flow for identifying levels of quantization for regions of an image in accordance with various embodiments of the invention;

FIG. 10 provides a process flow for measuring persistence for an image in accordance with various embodiments of the invention;

FIG. 11 provides a process flow for determining a persistence (projection) value for a run-length of an image in accordance with various embodiments of the invention;

FIG. 12 provides a process flow for classifying each region of an image with respect to a level of density in accordance with various embodiments of the invention.

DETAILED DESCRIPTION OF VARIOUS EMBODIMENTS

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents. The following brief definition of terms shall apply throughout the application.

The term "comprising" means including but not limited to, and should be interpreted in the manner it is typically used in the patent context. The phrases "in one embodiment," "according to one embodiment," and the like generally mean that the particular feature, structure, or characteristic following the phrase may be included in at least one embodiment of the present invention, and may be included in more than one embodiment of the present invention (importantly, such phrases do not necessarily refer to the same embodiment). If the specification describes something as "exemplary" or an "example," it should be understood that refers to a non-exclusive example; The terms "about" or "approximately" or the like, when used with a number, may mean that specific number, or alternatively, a range in proximity to the specific number, as understood by persons of skill in the art field.

If the specification states a component or feature "may," "can," "could," "should," "would," "preferably," "possibly," "typically," "optionally," "for example," "often," or "might" (or other such language) be included or have a characteristic, that particular component or feature is not required to be included or to have the characteristic. Such component or feature may be optionally included in some embodiments, or it may be excluded.

GENERAL OVERVIEW OF VARIOUS EMBODIMENTS

Various embodiments of the invention are introduced using some type of low magnification imaging such as, for example, raster scanning imaging, to initially obtain a fast-acquired low magnification image of a sample and then dynamically adjusting the imaging parameters (such as magnification) to obtain an optimal image with respect to the object density in any local neighborhood (region) of the image. Accordingly, increased speed is obtained in these embodiments by determining to capture the image in high magnification only in local neighborhoods considered as target areas of the sample.

Here, in various embodiments, the densities of objects are quantified in various regions of interest so that the right magnification levels for imaging these different regions can be set automatically. Objects are generally considered items found in a sample that are to be imaged. For example, the sample may be an IC of a semiconductor and the objects may be the specific structure found on the IC. Here, a high level of detail may be needed with respect to the structure of the IC. While in another example, the sample may be a crystal structure and the objects may be cleavage found within the structure.

Once the density of objects has been quantified for a particular region, the imaging equipment (e.g., a SEM) can increase the magnification with a predefined step (10×, 100×, 1000×, etc.) and collect a new image when the region is detected as a dense region. Here, in various embodiments, a "region" can be viewed as an aggregated representation of pixels found in the overall image of the sample. This process can be repeated for the different regions until the sample is imaged with the right magnifications at the various regions. Accordingly, in particular embodiments, the image analysis may incorporate machine learning and deep learning algorithms. In addition, as the image analysis is further developed over time in particular embodiments, the acceptance of lower magnified images may be learned that can aid in considerably reducing imaging time requirements for various imaging modalities.

Thus, as previously mentioned, images are typically acquired giving equal focus to all objects in the sample irrespective of their shapes and sizes. In situations where accuracy is indispensable, this can require higher magnification settings leading to overall inflation of the imaging time frame. However, various embodiments of the invention provide unsupervised techniques that can measure the size of the structures and dynamically update magnification settings for reduced imaging time frames.

Some of the key features found in various embodiments include incorporating the idea of shapes and sizes (density) to objects and dynamically adjusting imaging parameters so that larger objects are imaged with lower magnification and smaller objects are images with higher magnification. Thus, embodiments of the invention result in a significant reduction to overall imaging time in imaging modalities with high correlation between magnifications and imaging time. In addition, various embodiments are dynamic in nature and only require knowledge of the local neighborhood in the sample. These embodiments can adapt to changes in object density in real-time and hence can enable imaging modalities to work on small sections of a sample instead of having to acquire images of the entire sample for comparison. Further, the weightage assigned by various embodiments to the shape and size of objects can be fine-tuned with prior knowledge to yield an optimal quality image for any specific application. Furthermore, various embodiments introduce automation to a previously hand-tuned imaging platform, saving considerable time on human intervention in the tuning of imaging parameters. Finally, various embodiments are simple, parallelizable and efficient and can be applied onto any existing imaging platform without considerable changes.

Computer Program Products, Systems, Methods, and Computing Entities

Embodiments of the present invention may be implemented in various ways, including as computer program products that comprise articles of manufacture. Such computer program products may include one or more software components including, for example, software objects, methods, data structures, and/or the like. A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform. Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, and/or a report writing language. In one or more example embodiments, a software component comprising instructions in one of the foregoing examples of programming languages may be executed directly by an operating system or other software component without having to be first transformed into another form. A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present invention may also be implemented as methods, apparatus, systems, computing devices, computing entities, and/or the like. As such, embodiments of the present invention may take the form of a data structure, apparatus, system, computing device, computing entity, and/or the like executing instructions stored on a computer-readable storage medium to perform certain steps or operations. Thus, embodiments of the present invention may also take the form of an entirely hardware embodiment, an entirely computer program product embodiment, and/or an embodiment that comprises combination of computer program products and hardware performing certain steps or operations.

Embodiments of the present invention are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically configured machines performing the steps or operations specified in the block diagrams and flowchart illustrations. Accordingly, the block diagrams and flowchart illustrations support various combinations of embodiments for performing the specified instructions, operations, or steps.

Exemplary Scanning Electron Microscopy System

Although various embodiments of the invention may be carried out with respect to different types of imaging modalities, the remaining disclosure it discussed with respect to using various embodiments in a Scanning Electron Microscopy (SEM) environment. A SEM environment is used to illustrate these embodiments and to help facilitate the reader's understanding of the embodiments. Thus, it should be understood that embodiments of the invention may be used along with other imaging modalities and the discussion of various embodiments involving an SEM environment does not limit the scope of the invention.

Figure 1:
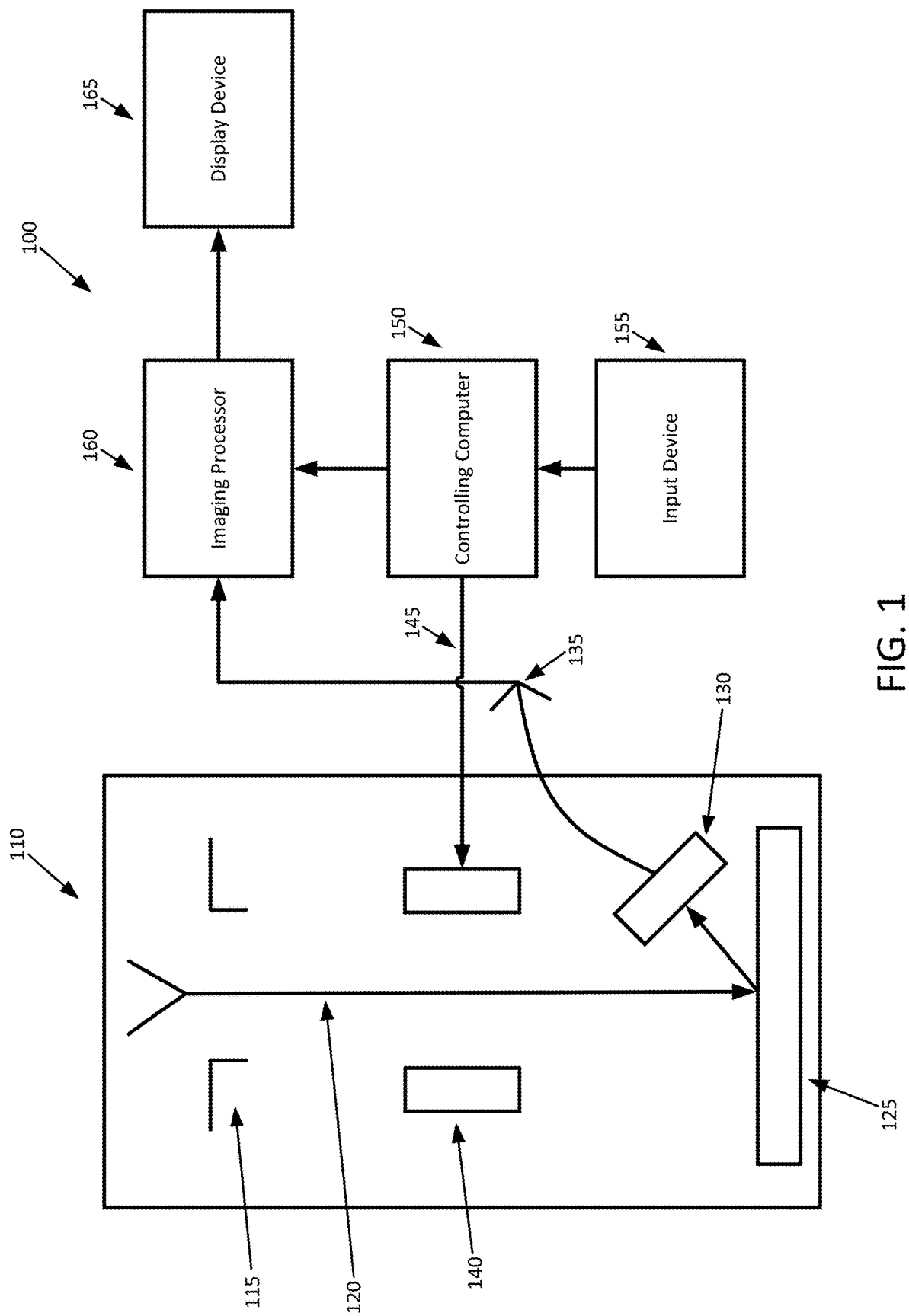
FIG. 1 is a schematic of a scanning electron microscope system that may be used in accordance with various embodiments of the present invention.

Turning now to FIG. 1, this figure provides a schematic configuration of a SEM system 100 that can be used in accordance with various embodiments of the present invention. The body 110 of the SEM microscope includes an electron gun 115 through which an electron beam 120 is emitted and converged by an electron lens (not shown) and irradiated on a sample 125. An electron detector 130 detects the intensity of secondary electrons generated from the surface of the sample 125 or intensity of reflected electrons by electron beam irradiation. Accordingly, an amplifier 135 amplifies the electron beam 120 and a deflector 140 deflects the beam 120, subjecting the beam 120 to raster scanning on the sample surface according to a control signal 145 provided by a controlling computer 150. Here, the control signal 145 indicates parameters for performing the scanning of the sample 125 such as, for example, the magnification that is to be used. One or more input devices 155 such as a keyboard and/or a mouse may be connected to the controlling computer 150. A signal outputted from the amplifier 135 is converted from analog to digital inside an imaging processor 160 to generate digital image data. Accordingly, a display device 165 may be used to view the image data. Moreover, the imaging processor 160 may include memory for storing the digital image data and may perform various imaging processes and display controls.

Exemplary Computing Entity

Figure 2:
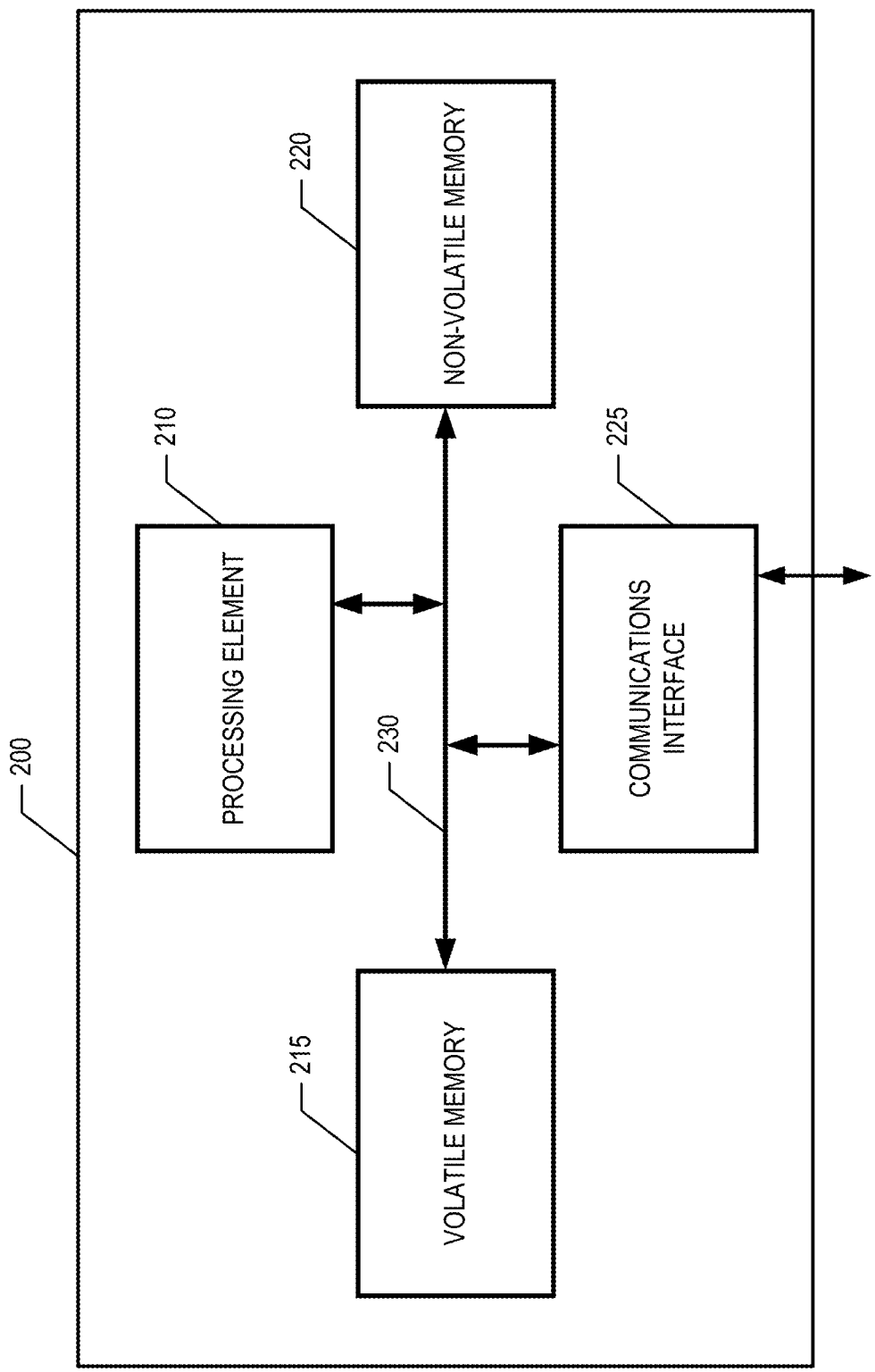
FIG. 2 is a schematic of a computing entity that may be used in accordance with various embodiments of the present invention.

FIG. 2 provides a schematic of a computing entity 200 that may be used in accordance with various embodiments of the present invention. For instance, the computing entity 200 may be the controlling computer 150 found within the SEM system 100 previously described in FIG. 1. In general, the terms computing entity, entity, device, system, and/or similar words used herein interchangeably may refer to, for example, one or more computers, computing entities, desktop computers, mobile phones, tablets, phablets, notebooks, laptops, distributed systems, items/devices, terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably.

Although illustrated as a single computing entity, those of ordinary skill in the art should appreciate that the computing entity 200 shown in FIG. 2 may be embodied as a plurality of computing entities, tools, and/or the like operating collectively to perform one or more processes, methods, and/or steps. As just one non-limiting example, the computing entity 200 may comprise a plurality of individual data tools, each of which may perform specified tasks and/or processes.

Depending on the embodiment, the computing entity 200 may include one or more network and/or communications interfaces 225 for communicating with various computing entities, such as by communicating data, content, information, and/or similar terms used herein interchangeably that can be transmitted, received, operated on, processed, displayed, stored, and/or the like. Thus, in certain embodiments, the computing entity 200 may be configured to receive data from one or more data sources and/or devices as well as receive data indicative of input, for example, from a device.

The networks used for communicating may include, but are not limited to, any one or a combination of different types of suitable communications networks such as, for example, cable networks, public networks (e.g., the Internet), private networks (e.g., frame-relay networks), wireless networks, cellular networks, telephone networks (e.g., a public switched telephone network), or any other suitable private and/or public networks. Further, the networks may have any suitable communication range associated therewith and may include, for example, global networks (e.g., the Internet), MANs, WANs, LANs, or PANs. In addition, the networks may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, satellite communication mediums, or any combination thereof, as well as a variety of network devices and computing platforms provided by network providers or other entities.

Accordingly, such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the computing entity 200 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra-wideband (UWB), infrared (IR) protocols, near field communication (NFC) protocols, Wibree, Bluetooth protocols, wireless universal serial bus (USB) protocols, and/or any other wireless protocol. The computing entity 200 may use such protocols and standards to communicate using Border Gateway Protocol (BGP), Dynamic Host Configuration Protocol (DHCP), Domain Name System (DNS), File Transfer Protocol (FTP), Hypertext Transfer Protocol (HTTP), HTTP over TLS/SSL/Secure, Internet Message Access Protocol (IMAP), Network Time Protocol (NTP), Simple Mail Transfer Protocol (SMTP), Telnet, Transport Layer Security (TLS), Secure Sockets Layer (SSL), Internet Protocol (IP), Transmission Control Protocol (TCP), User Datagram Protocol (UDP), Datagram Congestion Control Protocol (DCCP), Stream Control Transmission Protocol (SCTP), HyperText Markup Language (HTML), and/or the like.

In addition, in various embodiments, the computing entity 200 includes or is in communication with one or more processing elements 210 (also referred to as processors, processing circuitry, and/or similar terms used herein interchangeably) that communicate with other elements within the computing entity 200 via a bus 230, for example, or network connection. As will be understood, the processing element 210 may be embodied in several different ways. For example, the processing element 210 may be embodied as one or more complex programmable logic devices (CPLDs), microprocessors, multi-core processors, coprocessing entities, application-specific instruction-set processors (ASIPs), and/or controllers. Further, the processing element 210 may be embodied as one or more other processing devices or circuitry. The term circuitry may refer to an entirely hardware embodiment or a combination of hardware and computer program products. Thus, the processing element 210 may be embodied as integrated circuits, application specific integrated circuits (ASICs), field programmable gate arrays (FPGAs), programmable logic arrays (PLAs), hardware accelerators, other circuitry, and/or the like. As will therefore be understood, the processing element 210 may be configured for a particular use or configured to execute instructions stored in volatile or non-volatile media or otherwise accessible to the processing element 210. As such, whether configured by hardware, computer program products, or a combination thereof, the processing element 210 may be capable of performing steps or operations according to embodiments of the present invention when configured accordingly.

In various embodiments, the computing entity 200 may include or be in communication with non-volatile media (also referred to as non-volatile storage, memory, memory storage, memory circuitry and/or similar terms used herein interchangeably). For instance, the non-volatile storage or memory may include one or more non-volatile storage or memory media 220 such as hard disks, ROM, PROM, EPROM, EEPROM, flash memory, MMCs, SD memory cards, Memory Sticks, CBRAM, PRAM, FeRAM, RRAM, SONOS, racetrack memory, and/or the like. As will be recognized, the non-volatile storage or memory media 220 may store files, databases, database instances, database management system entities, images, data, applications, programs, program modules, scripts, source code, object code, byte code, compiled code, interpreted code, machine code, executable instructions, and/or the like. The term database, database instance, database management system entity, and/or similar terms used herein interchangeably and in a general sense to refer to a structured or unstructured collection of information/data that is stored in a computer-readable storage medium.

In particular embodiments, the memory media 220 may also be embodied as a data storage device or devices, as a separate database server or servers, or as a combination of data storage devices and separate database servers. Further, in some embodiments, the memory media 220 may be embodied as a distributed repository such that some of the stored information/data is stored centrally in a location within the system and other information/data is stored in one or more remote locations. Alternatively, in some embodiments, the distributed repository may be distributed over a plurality of remote storage locations only. As already discussed, various embodiments contemplated herein use data storage in which some or all the information/data required for various embodiments of the invention may be stored.

In various embodiments, the computing entity 200 may further include or be in communication with volatile media (also referred to as volatile storage, memory, memory storage, memory circuitry and/or similar terms used herein interchangeably). For instance, the volatile storage or memory may also include one or more volatile storage or memory media 215 as described above, such as RAM, DRAM, SRAM, FPM DRAM, EDO DRAM, SDRAM, DDR SDRAM, DDR2 SDRAM, DDR3 SDRAM, RDRAM, RIMM, DIMM, SIMM, VRAM, cache memory, register memory, and/or the like. As will be recognized, the volatile storage or memory media 215 may be used to store at least portions of the databases, database instances, database management system entities, data, images, applications, programs, program modules, scripts, source code, object code, byte code, compiled code, interpreted code, machine code, executable instructions, and/or the like being executed by, for example, the processing element 210. Thus, the databases, database instances, database management system entities, data, images, applications, programs, program modules, scripts, source code, object code, byte code, compiled code, interpreted code, machine code, executable instructions, and/or the like may be used to control certain aspects of the operation of the computing entity 200 with the assistance of the processing element 210 and operating system.

As will be appreciated, one or more of the computing entity's components may be located remotely from other computing entity components, such as in a distributed system. Furthermore, one or more of the components may be aggregated and additional components performing functions described herein may be included in the computing entity 200. Thus, the computing entity 200 can be adapted to accommodate a variety of needs and circumstances.

Exemplary System Operation

The functionality described herein may be carried out on a computing entity 200 such as the controlling computer 150 previously described in FIG. 1. Accordingly, the computing entity 200 may carry out the functionality as logical operations and these logical operations may be implemented (1) as a sequence of computer implemented acts or one or more program modules running on the computing entity and/or (2) as interconnected machine logic circuits or circuit modules within the computing entity. The implementation is a matter of choice dependent on the performance and other requirements of the computing entity 200. Accordingly, the logical operations described herein are referred to variously as states, operations, structural devices, acts, or modules. These operations, structural devices, acts, and modules may be implemented in software, in firmware, in special purpose digital logic, and any combination thereof. Greater or fewer operations may be performed than shown in the figures and described herein. These operations may also be performed in a different order than those described herein.

Figure 3:
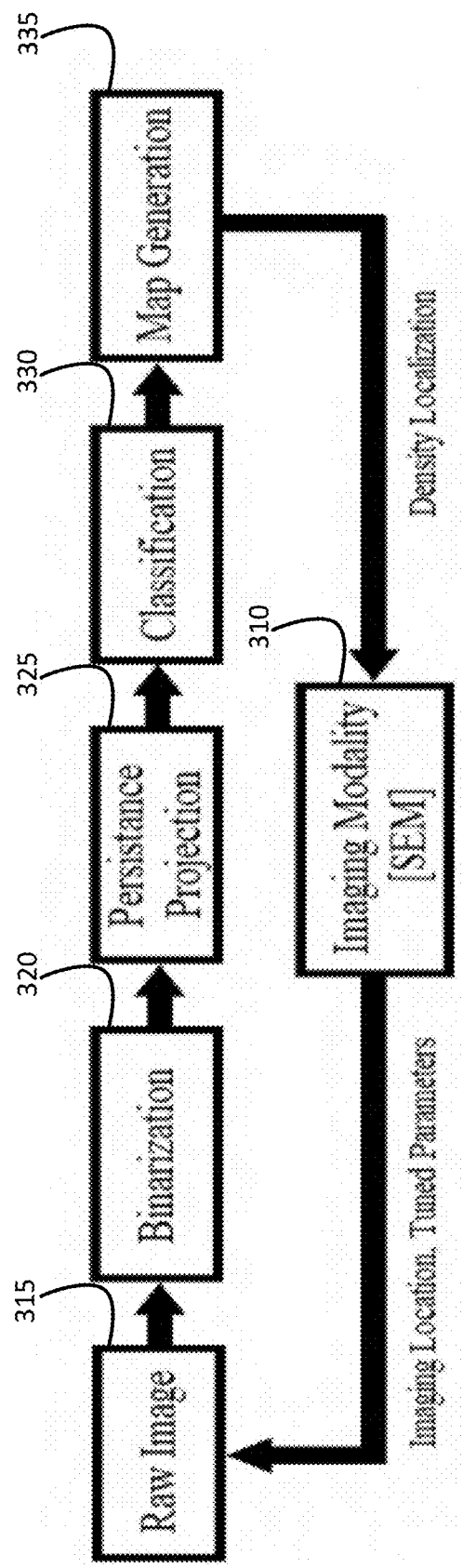
FIG. 3 shows a workflow dynamically adjusting imaging parameters in accordance with various embodiments of the invention.

Thus, a workflow 300 is shown in FIG. 3 for dynamically adjusting imaging parameters according to various embodiments of the invention. Here, the imaging modality (e.g., SEM) 310 generates a raw image 315 of a sample in a conventional manner. The sample in this instance is the surface of IC. The workflow 300 includes a number of steps, as described in the following text.

Raw Image Acquisition

Accordingly, various embodiments involve initially receiving the raw image 315 acquired at low magnification by SEM 310. Here, the raw image 315 is used to localize the density of the objects found in the sample for further fine-tuning (e.g., the structure of the surface of the IC). In particular embodiments, a user is only required to define one parameter beforehand, the level of quantization used to classify density. In this instance, the level of quantization (density) is chosen to be two for simplicity. However, those of ordinary skill in the art will understand that the level of quantization (density) is not limited to only two levels in other embodiments. Depending on the application, the level of quantization (density) can be increased depending on the accuracy and the level of fine-tuning a user is willing to accept.

Figure 4:
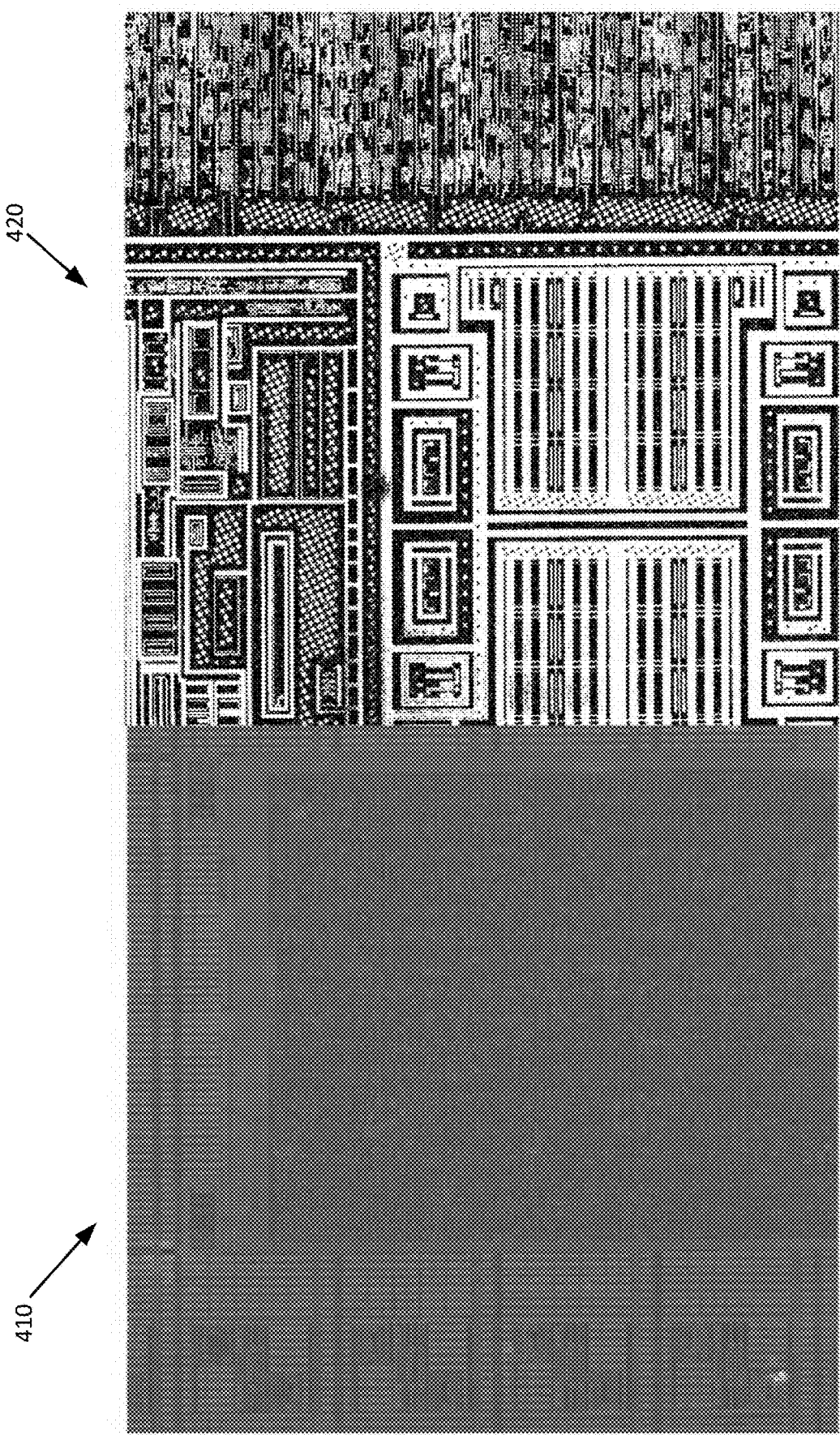
FIG. 4 illustrates raw images of an Integrated Circuit (IC)

For example, FIG. 4 illustrates raw images of an IC of a semiconductor acquired using the SEM 310. The IC sample has a dense active region 410 on the left side and a less dense metal layer 420 on the right side. The image of the active region 410 was acquired using a magnification of 200 μm, 3.2 μs/pixel dwelling time and at a resolution of 1280×1280. Therefore this image has a low quality at a low magnification. The image of the metal layer 420 is of considerably higher quality with parameters of 100 μm magnification, 32 μs/pixel dwelling time and resolution of 4096×4096. This image is at a higher magnification with high quality. These examples are used throughout the disclosure to emphasize the robustness of various embodiments' abilities to work on samples of both high and low qualities.

Binarizing the Raw Image

Figure 5:
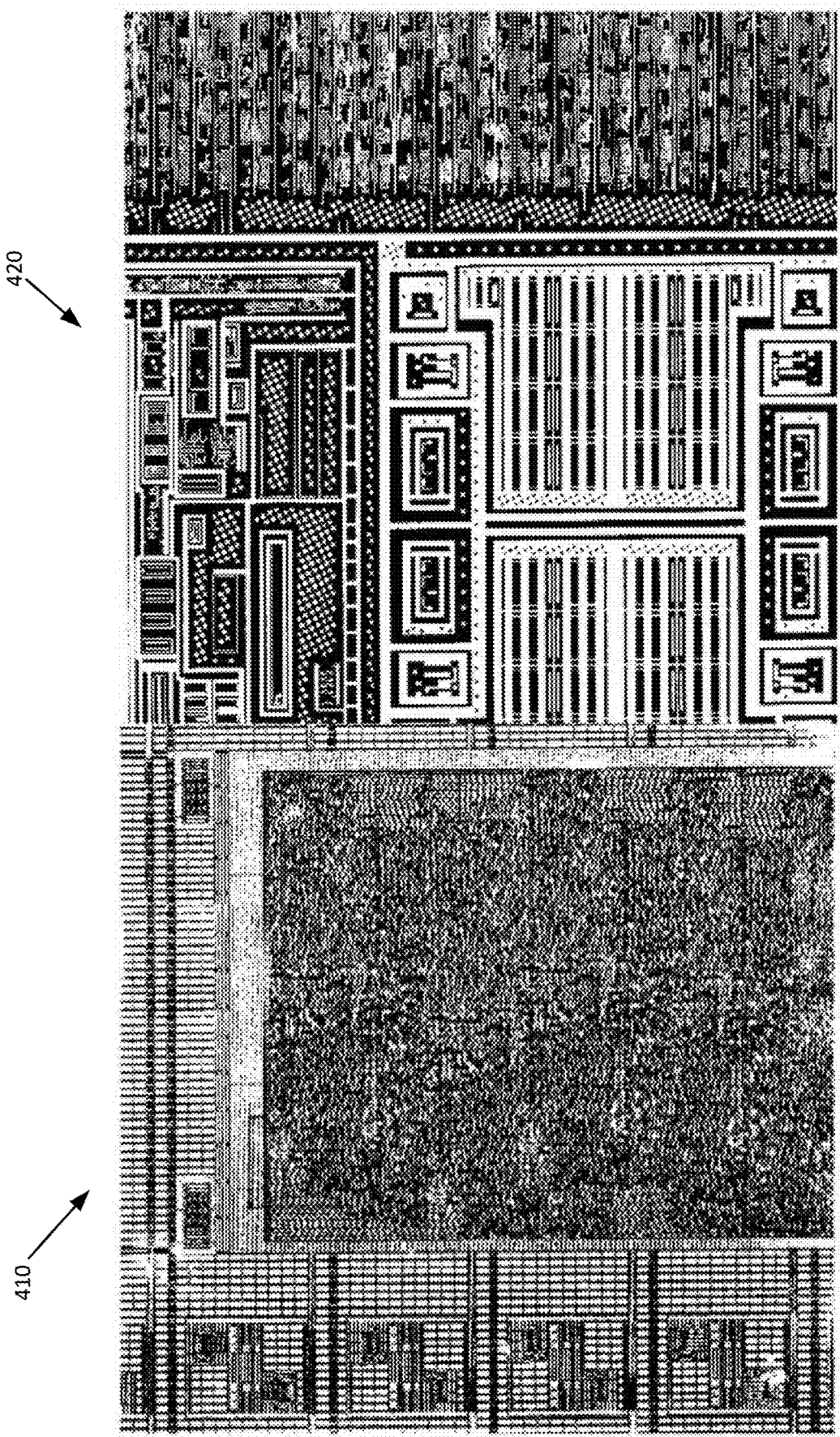
FIG. 5 illustrates binary images of the IC that may be used in accordance with various embodiments of the invention.

Returning to FIG. 3, binarization 320 involves transforming the raw image 315 into a binary image. Accordingly, the binarization process in various embodiments forces the pixel values in the raw image 315 into either "1" or "0" while still maintaining the basic structure and contrast of the image 315. Depending on the embodiment, this process can be done using binarization algorithms such as off-the-shelf algorithms like Otsu's method or propriety algorithms tailored to a specific application. The results of the binarization process can be seen in FIG. 5. Here, binarization quantizes the images of the active region 410 and the metal layer 420 into two discrete intensity levels reducing the uncertainty in the pixels that belong to the background or the objects being imaged. It also reduces the memory complexity in storing the images.

Measuring Persistence and Projecting it onto the Image Axes

The workflow 300 continues with obtaining a persistence measure 325 for the image on the y-axis, e.g., a row projection for the image. Accordingly, in various embodiments, this step involves the extraction of run-length encoded components for different run-lengths of the image and the projection of the entire image onto its axes for the different run-lengths. A run-length encoded component is defined as the length of a sequence of adjacent pixels having the same pixel value found in a run-length for an image. Here, a run-length is used to represent a dimension of the image such as a row or column found in an image. For example, the below steps may be carried out in particular embodiments to calculate the persistence measure for the particular run-lengths, in this instance rows, of an image:

| To calculate persistence measure for an image |
|---|
| 1:     for every row i in the image do |
| 2:         Initialize run_length to an empty array |
| 3:         Initialize count to 0 |
| 4:         for every column j in the image do |
| 5:             if image[i,j] ! = image[i,j + 1] then |
| 6:                 count ← count + 1 |
| 7:             else |
| 8:                 Append count to run_length |
| 9:                 count ← 0 |
| 10:             end if |
| 11:         end for |
| 12:         for each unique value in run_length do |
|                 persistence[i] = sum(unique value / frequency of unique value) |
| 13:         end for |
| 14:     end for |

The same process can also be applied after transposing the image to obtain a column projection of the image. The projections can also be normalized by the length of axes for easy visual interpretation. However, this normalization generally provides no additional benefit to the method.

Figure 6A:
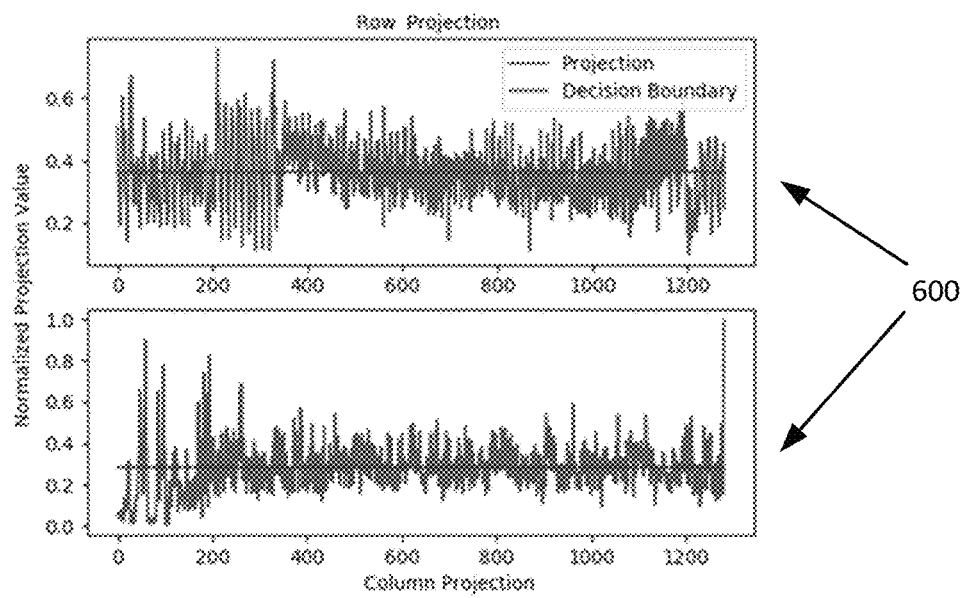
FIGS. 6A and 6B show plots of run-length projection data for the IC that may be used in accordance with various embodiments of the invention.
Figure 6B:
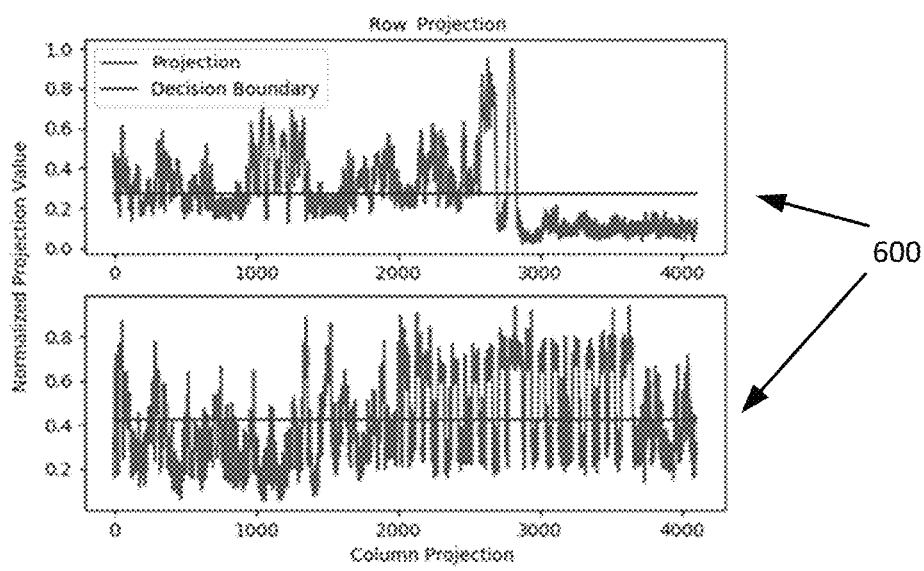

Thus, in various embodiments, a higher penalty is assigned to a short run-length encoded component with high frequency and a low penalty is assigned to a long run-length encoded component with low frequency. This can be seen from the projection plots shown in FIGS. 6A and 6B. FIG. 6A shows the run-length projection data plots for the active region 410 taken along rows (top) and columns (bottom) respectively. FIG. 6B shows the run-length projection data plots for the metal layer 420 taken along rows (top) and columns (bottom) respectively. Accordingly, the closer the projection values are to the corresponding axis 600, the higher the density of objects in the region.

Classification and Map Generation

Returning to FIG. 3, the workflow 300 continues with classifying each of the regions 330 as high density or low density with respect to a chosen level of density to generate a frequency map 335 for the image. For instance, in various embodiments, the decision can be made using simple thresholding or machine learning techniques.

For example, the decision boundary may be chosen to be the mean of the persistence on its corresponding axis. Here, a threshold model may be applied to the data shown in FIGS. 6A and 6B. If the persistence (the projection value) is higher than the mean, the region is taken as low density and if the persistence is lower than the mean, the region is taken as high density. Even though this approach is simple and effective, it might not necessarily capture all the necessary information in particular instances to make a fully informed classification.

Figure 7A:
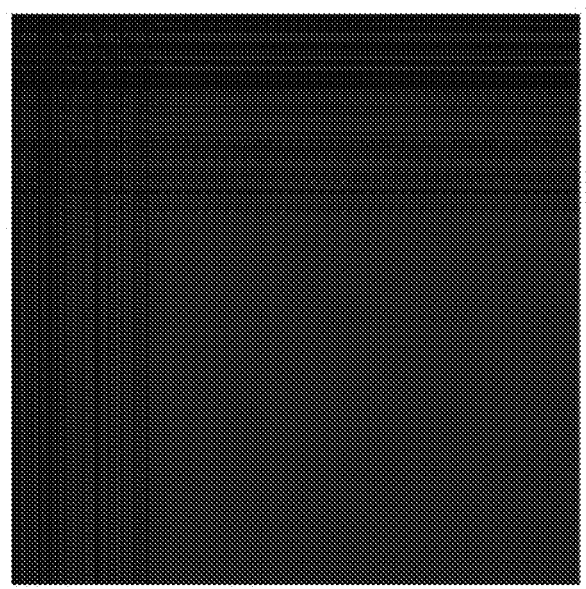
FIGS. 7A and 7B show frequency maps for the IC produced in accordance to various embodiments of the inventions.
Figure 7B:
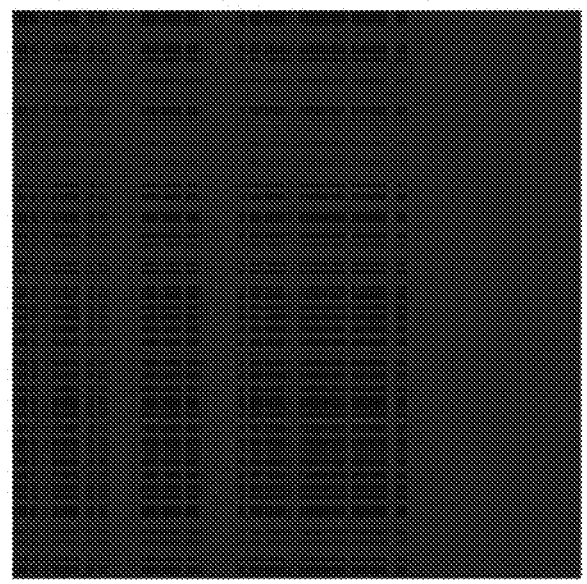

FIG. 7A shows the resultant frequency map obtained after running the threshold based algorithm on the active region 410. FIG. 7B shows the resultant frequency map obtained after running the threshold model on the metal layer 420. The lighter regions show high frequency and the darker regions show low frequency.

In other embodiments, a machine learning technique may be applied. For instance, in particular embodiments, a classification of each region is performed that involves using Gaussian Mixture Models (GMM) and Expectation Maximization (EM) to fit the values in the persistence projection to multiple Gaussian distributions. The number of distributions in the GMM is determined by the level of density decided by the user. For example, a two level quantization may be applied to the active region and the metal layer of the IC sample. The mean of the distribution is obtained from the GMM and the persistence is classified as high or low density based at least in part on its proximity to either distribution. The lower mean corresponds to higher density and higher mean to lower density.

Figure 8A:
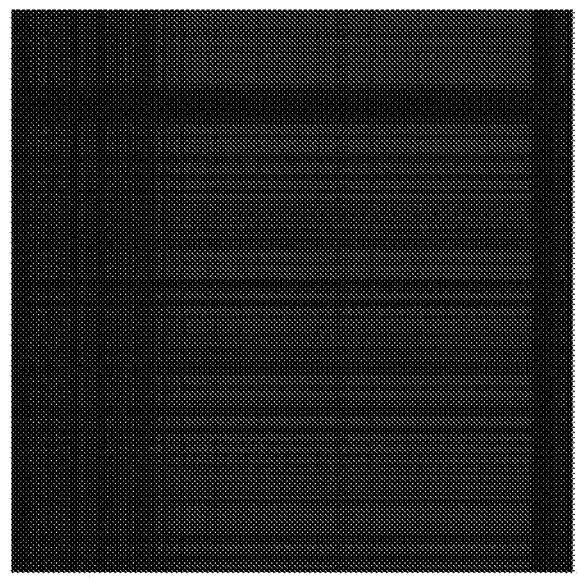
FIGS. 8A and 8B show additional frequency maps for the IC produced in accordance to various embodiments of the inventions.
Figure 8B:
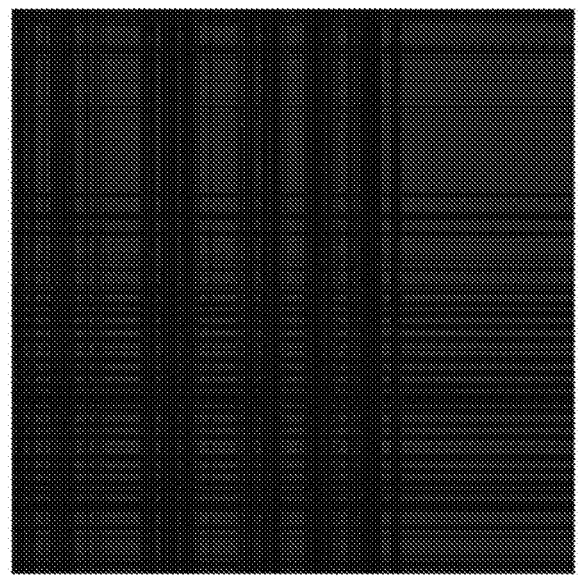

FIG. 8A shows the resultant frequency map obtained after classifying the regions with respect to two levels of quantization and the GMM on the active region 410 and FIG. 8B shows the resultant frequency map obtained after classifying the regions with respect to the two levels of quantization and the GMM on the metal layer 420. Again, the lighter regions show high frequency and the darker regions show low frequency. It can be observed in this particular example that the results from the GMM in FIGS. 8A and 8B fit the density better than the simple thresholding model using the mean in FIGS. 7A and 7B.

Only two levels of quantization are applied in the examples discussed above. However, as previously noted, more than two levels of quantization can be used. For example, three levels of quantization may be used such as low frequency, medium frequency, and high frequency. Here, for instance, a first threshold can be set for identifying regions with having either low frequency or higher frequencies and a second threshold can be set for identifying those regions with persistence over the first threshold as having either medium frequency or high frequency. Accordingly, a different magnification can be then used for each of the levels of quantization. Those of ordinary skill in the art can envision other levels of quantization that can be utilized in other embodiments in light of this disclosure.

Quantization Module

Turning now to FIG. 9, additional details are provided regarding a process flow for identifying levels of quantization for regions of an image according to various embodiments. FIG. 9 is a flow diagram showing a quantization module for performing such functionality according to various embodiments of the invention. Depending on the embodiment, the quantization module can be implemented within a stand-alone add-on system to an existing imaging modality, or integrated into an existing software framework of the imaging modality.

For example, the quantization module can be added to an existing SEM microscope to adjust the magnification based at least in part on IC feature sizes of a semiconductor being imaged. Here, the SEM electron beam sampling rate can be controlled on the raw image over the field of view using an initial low magnification raw image as an input. The low magnification raw image can then serve as input to the quantization module. Once initialized, the module performs an analysis on the input to generate a frequency map as described above. Accordingly, the frequency map can then be provided as an input to the SEM system 100 to guide the sampling rate and magnification on different regions within the image using the presented inputs.

The process flow 900 begins in FIG. 9 with the quantization module receiving the raw image of the sample having one or more objects in Operation 910. For example, the sample may be of an IC of a semiconductor and the one or more objects are the structure of the IC. As previously mentioned, the raw image is acquired by the imaging modality using a low magnification. Next, the quantization module transforms the raw image into a binary image in Operation 915. Accordingly, in particular embodiments, the quantization module applies some type of binarization algorithm to the image to assign values of "1" or "0" to the pixels found in the image. As a result, the binarization quantizes the image into two discrete intensity levels reducing the uncertainty in each pixel belonging to either the background or an object.

The quantization module then uses the binary image to measure the persistence and project the persistence onto one or more image axes. Specifically, in this instance, the quantization module obtains the persistence measure for the image on its y-axis in Operation 920. Here, in particular embodiments, the quantization module performs this particular operation by invoking a persistence module. In turn, the persistence module measures the persistence for image along rows to produce a row projection of the image. In addition, the quantization module obtains the persistence measure for the image on its x-axis in Operation 925. Similarly, in particular embodiments, the quantization module performs this operation by invoking the persistence module and in this instance, the persistence module measures the persistence for the image along columns to produce a column projection of the image.

As discussed in further detail herein, the persistence module is configured to extract run-length encoded components from various dimensions (e.g., rows and/or columns) for the image and project the entire image onto its axes based at least in part on these extracted run-length encoded components. A run-length encoded component is defined as the length of a sequence of adjacent pixels having the same pixel value found in a dimension (e.g., a row or column) of the image. A projection value is then shown on a projection for a particular axis (e.g., y-axis or x-axis) for a particular dimension (e.g., a particular row or column) that is calculated as the sum of all unique values for the run-length encoded components found in the particular dimension divided by the value's corresponding frequency of appearance in the dimension.

Accordingly, a higher penalty is assigned for short run-length encoded components found in the dimension for an image with high frequency and a low penalty is assigned for long run-length encoded components found in the dimension for the image with low frequency. With respect to the projections, the closer the projection values are to the corresponding axis, the higher the density of objects in that region of the image. Thus, in the example, the regions with higher density warrant a higher magnification setting on the imaging modality.

Therefore, in various embodiments, the quantization module identifies each region of the image with respect to a chosen level of quantization based at least in part on the projections in Operation 930. For example, the quantization module may identify each region of the image as either low density or high density based at least in part on y-axis and x-axis projections. Here, the quantization module is configured in particular embodiments to perform this operation by invoking a classification module. In turn, the classification module decides the level of quantization that is applicable for each region. As previously discussed, different mechanisms may be used depending on the embodiment by the classification module in deciding the level of quantization such as, for example, a simple threshold or a more complicated mechanism that involves machine learning techniques.

As a result, a frequency map of the image is generated in various embodiments that displays the different regions of the image (sample) and their corresponding levels of quantization. For example, a frequency map may be generated that shows high frequency regions of the image (sample) in one shade/color (e.g., color red) and low frequency regions of the image (sample) in a different shade/color (e.g., color blue). Accordingly, the quantization module returns the frequency map in Operation 935. At this point, an imaging modality may then use this map to repeat the imaging of the sample by setting imaging parameters for the various regions of the sample for the re-imaging. For example, the imaging modality may set a higher magnification and collect new images for regions of the sample identified as having a high density of objects. Here, it is noted that the frequency map may be referred to with respect to the image (e.g., raw image) of the sample or with respect to the sample itself. The two may be used interchangeably.

Persistence Module

Turning now to FIG. 10, additional details are provided regarding a process flow for measuring persistence for an image according to various embodiments. FIG. 10 is a flow diagram showing a persistence module for performing such functionality according to various embodiments of the invention. As previously mentioned, the persistence module may be invoked by another module in particular embodiments to measure persistence for an image such as, for example, the quantization module previously described. However, with that said, the persistence module may not necessarily be invoked by another module and may execute as a stand-alone module in other embodiments.

The process flow 1000 begins with the persistence module selecting a dimension for the image in Operation 1010. For example, the dimension may be a row or column of the image. The persistence module initializes a run-length for the dimension and a count. The run-length is used to record encoded components found in the dimension. Each run-length encoded component identifies a length of a sequence of adjacent pixels found in the dimension with the same pixel value.

Once selected, the persistence module selects a first unit for the dimension in Operation 1015. For example, if the dimension is a row of the image, then the first unit may be the first column found in the row. Likewise, if the dimension is a column of the image, then the first unit may be the first row found in the column. Accordingly, in particular embodiments, this first unit may represent the first pixel of the image found in the select dimension.

The persistence module then determines whether the value for the unit is the same as the value for the next unit in the dimension in Operation 1020. If the values are not the same, then the persistence module appends the current count to the run-length as a run-length encoded component in Operation 1025. In addition, the persistence module re-initializes the count. If the value is the same, then the persistence module adds one to the count in Operation 1030.

At this point, the persistence module determines whether another unit exits for the dimension in Operation 1035. If so, then the persistence module returns to Operation 1015, selects the next unit for the dimension, and repeats the operations just discussed for the newly selected unit.

If another unit does not exist for the dimension, then the persistence module appends the remaining count to the run-length as the last run-length encoded component for the run-length and determines a persistence value (projection value) for the dimension in Operation 1040. Here, in particular embodiments, the persistence module performs this operation by invoking a persistence value module. In turn, the persistence value module determines a persistence value for the dimension based at least in part on each unique value found in the run-length encoded components of the run-length for the dimension.

Once the persistence value has been determined for the dimension, the persistence module determines whether another dimension exists for the image in Operation 1045. If so, then the persistence module returns to Operation 1010, selects the next dimension for the image, and repeats the operations just described for the newly selected dimension. The persistence module exits the process flow 1000 once all of the dimensions (e.g., rows or columns) have been processed for the image. As previously discussed, the persistence values for the various dimensions (e.g., various rows and/or columns) are then used in various embodiments to transpose the image to obtain a projection (e.g., a row projection and/or a column projection) of the image. This projection can then be used in identifying a level of quantization for each region of the image.

Persistence Value Module

Turning now to FIG. 11, additional details are provided regarding a process flow for determining a persistence value (projection value) for a run-length representing a dimension of an image according to various embodiments. For example, the run-length may be for a row or column of an image. FIG. 11 is a flow diagram showing a persistence value module for performing such functionality according to various embodiments of the invention. As previously mentioned, the persistence value module may be invoked by another module in various embodiments to determine the persistence value for a run-length encoded component such as, for example, the persistence module previously described. However, with that said, the persistence value module may not necessarily be invoked by another module and may execute as a stand-alone module in other embodiments.

The process flow 1100 begins with the persistence value module querying the unique values found in the run-length encoded components of the run-length in Operation 1110. As previously noted, in various embodiments, each run-length encoded component found in the run-length represents a length of a sequence of adjacent pixels found in the dimension for the image with the same pixel value. Therefore, in these instances, the persistence value module selects each one of the values from the run-length encoded components that is unique. In addition, the persistence value module determines the frequency of each unique value appearing in the run-length encoded components for the run-length.

Accordingly, the persistence value module selects one of the unique values in Operation 1115. The persistence value module then determines a persistence value based at least in part on the selected unique value in Operation 1120. For instance, in particular embodiments, the persistence value module updates the persistence value for the run-length by dividing the unique value by its frequency of appearance in the run-length and adding it to the persistence value (e.g., persistence value=persistence value+(unique value/frequency of unique value).

The persistence value module then determines whether another unique value exists in the run-length in Operation 1125. If so, then the persistence value module returns to Operation 1110, selects the next unique value and repeats the operations just described for the newly selected value. Accordingly, a persistence value is determined for the run-length once all of the unique values found in the components have been processed. Thus, this value is calculated as the sum of each of unique values found in the encoded components for the run-length divided by each value's corresponding frequency. In particular embodiments, this value is then used as the projection value for the dimension (e.g., row or column) shown on the projection for the image.

Classification Module

Turning now to FIG. 12, additional details are provided regarding a process flow for classifying each region of an image as either low density or high density according to various embodiments. As previously noted, the levels of quantization may various among embodiments. However, to simplify the explanation of classifying different regions of an image into levels of quantization, the process flow shown in FIG. 12 classifies each region into either low density or high density. Although those of ordinary skill in the art should understand that other levels of quantization may be used in other embodiments.

FIG. 12 is a flow diagram showing a classification module for performing such functionality according to various embodiments of the invention. As previously mentioned, the classification module may be invoked by another module in various embodiments to classify the various regions of an image such as, for example, the quantization module as previously described. However, with that said, the classification module may not necessarily be invoked by another module and may execute as a stand-alone module in other embodiments.

The process flow 1200 begins with the classification module selecting a region for the image in Operation 1210. The classification module then determines whether the persistence found in the region is over a threshold in Operation 1215. As previously discussed, the classification module may make this determination using a simple threshold for a more complex threshold depending on the embodiment. For instance, in particular embodiments, a simple threshold may be identified such as the mean of the persistence of the image on its corresponding axis with respect to the persistence projection. Here, if the persistence for the region is higher than the mean, then the classification module marks the region as low density in Operation 1220. However, if the persistence for the region is lower than the mean, then the classification module marks the region as high density in Operation 1225.

While in other instances, a more complex threshold may be used such as using GMM and EM to fit the values found in the persistence projection to multiple gaussian distributions. The mean of the distribution is obtained from the GMM and the persistence for the region is classified as high or low density based at least in part on its proximity to either distribution. Thus, if the persistence for the region is closer to the higher mean, then the classification module marks the region as low density in Operation 1220. However, if the persistence for the region is closer to the lower mean, then the classification module marks the region as high density in Operation 1225.

At this point, the classification module determines whether another region exists for the image in Operation 1230. If so, then the classification module returns to Operation 1210, selects the next region, and repeats the operations just discussed for the newly selected region. Once all of the regions have been processed for the image, the classification module generates a frequency map for the image based at least in part on the marked regions in Operation 1235. Again, the frequency map may also be identified as a frequency map for the sample.

Accordingly, the frequency map identifies the level of quantization for each region of the image/sample. As previously discussed, this map may then be used by an imaging modality to set one or more parameters for imaging the various regions of the sample based at least in part on the level of quantization identified for each region. In particular embodiments, this level of quantization may also be referred to as the level of density since the level identifies the density of objects found in the region. For example, the magnification can be placed on a certain setting to image a particular region of the sample based at least in part on the level of density identified for the region.

CONCLUSION

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A computer-implemented method for generating a frequency map representing a density of objects found in a plurality of regions of a sample comprising:
   binarizing, by a computing device, a plurality of pixels for a raw image of the sample to transform the raw image into binary data comprising a value of one or zero set for each pixel of the plurality of pixels to quantize the raw image into two discrete intensity levels;
   generating, by the computing device, a plurality of run-length encoded components from the binary data for each of a plurality of dimensions for the raw image, each of the plurality of run-length encoded components for a particular dimension comprising a length of a sequence of adjacent pixels found in the particular dimension with the same value in the binary data;

generating, by the computing device, at least one projection of the raw image based at least in part on a projection value for each of the plurality of dimensions, the projection value for a particular dimension providing a measure of the density of the objects present in the particular dimension based at least in part on each unique value of the run-length encoded components generated for the particular dimension and a frequency of occurrence of the unique value;

determining, by the computing device, a classification for each region of the plurality of regions based at least in part on the at least one projection of the raw image, wherein the classification represents a level of density of the corresponding region; and generating, by the computing device, the frequency map comprising the determined classification for each region of the plurality of regions of the sample, wherein the frequency map is used to set at least one parameter of an imaging equipment for acquiring a second image of at least one region of the plurality of regions of the sample.

2. The computer-implemented method of claim 1, wherein the frequency map is used to set at least one parameter differently than used to acquire the raw image of the sample for acquiring images of regions of the plurality of regions with a particular level of density corresponding to a determined classification.

3. The computer-implemented method of claim 2, wherein the at least one parameter comprises a magnification that is set higher than a magnification used to acquire the raw image.

4. The computer-implemented method of claim 1, wherein determining the classification for each region of the plurality of regions involves at least one of (1) classifying the region as low density in response to one or more projection values corresponding to the region being above a threshold and as high density in response to the one or more projection values corresponding to the region being below the threshold and (2) classifying the region as low density in response to the one or more projection values corresponding to the region being closer to a higher mean of a first distribution of the projection values and a high density in response to the one or more projection values corresponding to the region being closer to a lower mean of a second distribution of the projection values.

5. The computer-implemented method of claim 4, wherein the threshold is based at least in part on a mean of the projection values that make up the projection.

6. The computer-implemented method of claim 4, wherein one or more Gaussian Mixture Models are used to fit the projection values that make up the projection to the first and second distributions.

7. The computer-implemented method of claim 1, wherein each of the dimensions comprises at least one of a row of the raw image and a column of the raw image.

8. An apparatus for generating a frequency map representing a density of objects found in a plurality of regions of a sample, the apparatus comprising at least one processor and at least one memory including a computer program code, the at least one memory and the computer program code configured to, with the at least one processor, cause the apparatus to:

binarize a plurality of pixels for a raw image of the sample to transform the raw image into binary data comprising a value of one or zero set for each pixel of the plurality of pixels to quantize the raw image into two discrete intensity levels;

generate a plurality of run-length encoded components from the binary data for each of a plurality of dimensions for the raw image, each of the plurality of run-length encoded components for a particular dimension comprising a length of a sequence of adjacent pixels found in the particular dimension with the same value in the binary data;

generate at least one projection of the raw image based at least in part on a projection value for each of the plurality of dimensions, the projection value for a particular dimension providing a measure of the density of the objects present in the particular dimension based at least in part on each unique value of the run-length encoded components generated for the particular dimension and a frequency of occurrence of the unique value;

determine a classification for each region of the plurality of regions based at least in part on the at least one projection of the raw image, wherein the classification represents a level of density of the corresponding region; and generate the frequency map comprising the determined classification for each region of the plurality of regions of the sample, wherein the frequency map is used to set at least one parameter of an imaging equipment for acquiring a second image of at least one region of the plurality of regions of the sample.

9. The apparatus of claim 8, wherein the frequency map is used to set at least one parameter differently than used to acquire the raw image of the sample for acquiring images of regions of the plurality of regions with a particular level of density corresponding to a determined classification.

10. The apparatus of claim 9, wherein the at least one parameter comprises a magnification that is set higher than a magnification used to acquire the raw image.

11. The apparatus of claim 8, wherein determining the classification for each region of the plurality of regions involves at least one of (1) classifying the region as low density in response to one or more projection values corresponding to the region being above a threshold and as high density in response to the one or more projection values corresponding to the region being below the threshold and (2) classifying the region as low density in response to the one or more projection values corresponding to the region being closer to a higher mean of a first distribution of the projection values and a high density in response to the one or more projection values corresponding to the region being closer to a lower mean of a second distribution of the projection values.

12. The apparatus of claim 11, wherein the threshold is based at least in part on a mean of the projection values that make up the projection.

13. The apparatus of claim 11, wherein one or more Gaussian Mixture Models are used to fit the projection values that make up the projection to the first and second distributions.

14. The apparatus of claim 8, wherein each of the dimensions comprises at least one of a row of the raw image and a column of the raw image.

15. A non-transitory computer storage medium comprising instructions for generating a frequency map representing a density of objects found in a plurality of regions of a sample, the instructions being configured to cause one or more processors to at least perform operations configured to:

binarize a plurality of pixels for a raw image of the sample to transform the raw image into binary data comprising a value of one or zero set for each pixel of the plurality of pixels to quantize the raw image into two discrete intensity levels;

generate a plurality of run-length encoded components from the binary data for each of a plurality of dimensions for the raw image, each of the plurality of run-length encoded components for a particular dimension comprising a length of a sequence of adjacent pixels found in the particular dimension with the same value in the binary data;

generate at least one projection of the raw image based at least in part on a projection value for each of the plurality of dimensions, the projection value for a particular dimension providing a measure of the density of the objects present in the particular dimension based at least in part on each unique value of the run-length encoded components generated for the particular dimension and a frequency of occurrence of the unique value;

determine a classification for each region of the plurality of regions based at least in part on the at least one projection of the raw image, wherein the classification represents a level of density of the corresponding region; and generate the frequency map comprising the determined classification for each region of the plurality of regions of the sample, wherein the frequency map is used to set at least one parameter of an imaging equipment for acquiring a second image of at least one region of the plurality of regions of the sample.

16. The non-transitory computer storage medium of claim 15, wherein the frequency map is used to set at least one parameter differently than used to acquire the raw image for acquiring images of regions of the plurality of regions of the sample with a particular level of density corresponding to a determined classification.

17. The non-transitory computer storage medium of claim 16, wherein the at least one parameter comprises a magnification that is set higher than a magnification used to acquire the raw image.

18. The non-transitory computer storage medium of claim 15, wherein determining the classification for each region of the plurality of regions involves at least one of (1) classifying the region as low density in response to one or more projection values corresponding to the region being above a threshold and as high density in response to the one or more projection values corresponding to the region being below the threshold and (2) classifying the region as low density in response to the one or more projection values corresponding to the region being closer to a higher mean of a first distribution of the projection values and a high density in response to the one or more projection values corresponding to the region being closer to a lower mean of a second distribution of the projection values.

19. The non-transitory computer storage medium of claim 18, wherein the threshold is based at least in part on a mean of the projection values that make up the projection.

20. The non-transitory computer storage medium of claim 18, wherein one or more Gaussian Mixture Models are used to fit the projection values that makes up the projection to the first and second distributions.

21. The non-transitory computer storage medium of claim 15, wherein each of the dimensions comprises at least one of a row of the raw image and a column of the raw image.

* * * * *